(12) United States Patent
Isobe (10) Patent No.: US 9,787,920 B2
(45) Date of Patent: Oct. 10, 2017

(54) IMAGE PICKUP APPARATUS AND IMAGE PICKUP SYSTEM

(71) Applicant: CANON KABUSHIKI KAISHA, Tokyo (JP)

(72) Inventor: Shingo Isobe, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/042,700

(22) Filed: Feb. 12, 2016

(65) Prior Publication Data

US 2016/0255291 A1     Sep. 1, 2016

(30) Foreign Application Priority Data

Feb. 26, 2015  (JP) ................. 2015-036105

(51) Int. Cl.
*H04N 5/359* (2011.01)
(52) U.S. Cl.
CPC ................. *H04N 5/3598* (2013.01)
(58) Field of Classification Search
CPC .... H04N 5/3598; H04N 5/217–5/2178; H04N 5/357–5/3675; H04N 5/35536–5/35581; H04N 3/1556; H04N 3/1568; H04N 5/213
See application file for complete search history.

(56) References Cited

U.S. PATENT DOCUMENTS

| | | | |
|---|---|---|---|
| 8,130,303 | B2 | 3/2012 | Kondo et al. |
| 2006/0279650 | A1* | 12/2006 | Watanabe ............ H04N 5/3598 348/308 |
| 2009/0086069 | A1* | 4/2009 | Gomi ................... H04N 5/3696 348/294 |
| 2009/0284634 | A1* | 11/2009 | Tsukimura ........... H04N 5/3598 348/308 |
| 2009/0295967 | A1* | 12/2009 | Gomi ................... H04N 5/3598 348/308 |
| 2011/0134290 | A1* | 6/2011 | Park ..................... H04N 5/3595 348/248 |
| 2014/0139713 | A1* | 5/2014 | Gomi ................... H04N 5/3598 348/308 |

FOREIGN PATENT DOCUMENTS

| | | |
|---|---|---|
| JP | 2009200660 A | 9/2009 |
| JP | 2010268162 A | 11/2010 |

* cited by examiner

*Primary Examiner* — Jason Flohre
(74) *Attorney, Agent, or Firm* — Rossi, Kimms & McDowell LLP (57) ABSTRACT

An image pickup apparatus outputs a picked-up image signal based on a difference between an electric charge signal and a noise signal generated by a photoelectric converter. The apparatus has a generating unit that generates a difference image that is based on a difference between a first image picked up under a first image pickup condition and a second image picked up under a second image pickup condition in which an exposure amount of the photoelectric converter is smaller than the exposure amount of the photo electric converter in the first image pickup condition, a detector that detects a black spot area on the basis of the difference image generated by the generating unit, and a voltage controller that controls a clip voltage that is set to limit a voltage of the noise signal, on the basis of the detected black spot area.

14 Claims, 8 Drawing Sheets

| MODE | DAYTIME MODE | NIGHT MODE |
|---|---|---|
| VclipH INITIAL VALUE | VclipH1 | VclipH2 |

IMAGE PICKUP APPARATUS AND IMAGE PICKUP SYSTEM

BACKGROUND OF THE INVENTION

Field of the Invention

The present invention relates to an image pickup apparatus, more particularly to an image pickup apparatus having the function of reducing the black sun phenomenon occurring particularly when shooting a highly-bright object. The present invention also relates to an image pickup system including such an image pickup apparatus and a lens apparatus.

Description of the Related Art

Many conventional image pickup apparatuses use a solid state image pickup element. CMOS image sensors are widely used as solid state image pickup elements. Some CMOS sensors are provided with a correlation double sampling (CDS) circuit. The CDS circuit generates a differential signal of a reset level signal (which will be referred to as N signal, hereinafter) and a signal picked up in a state in which light is incident on the image sensor (which will be referred to as S signal, hereinafter) and outputs the differential signal as a picked up signal. This process provides an improvement addressing the problem of fixed pattern noise generated in a solid state image pickup element by variations of characteristics among pixels and amplifiers provided for pixel rows.

However, there is a problem that when light having a high intensity greatly exceeding the signal saturation level is incident on the image sensor, leakage of light from a photodiode (PD) to a floating diffusion (FD) occurs, leading to an increase in the N signal level. Consequently, the difference between the S signal and the N signal becomes small in the CDS circuit, and the level of the output image pickup signal lowers. This phenomenon is called "black sun phenomenon".

Japanese Patent Application Laid-Open No. 2009-200660 teaches to provide a clip circuit so as to prevent the aforementioned N signal level from exceeding a predetermined voltage value when high-intensity light is incident on the image sensor. According to Japanese Patent Application Laid-Open No. 2009-200660, even if light leaks to the FD upon the incidence of high-intensity light, the voltage level of the N signal will be limited by the clip voltage value set to the clip circuit. In consequence, the black sun phenomenon of the picked up signal generated from the CDS as the differential signal of the S signal and the N signal is mitigated.

Japanese Patent Application Laid-Open No. 2010-268162 discloses an improvement in which when black sun phenomenon occurs while picking up a highly-bright image, the output of the CDS circuit is replaced by a saturation output. In the technology disclosed in Japanese Patent Application Laid-Open No. 2010-268162, a pixel area in which the black sun phenomenon can occur is detected by prediction by applying different accumulation times to a first pixel group and a second pixel group.

In the aforementioned prior arts, it is difficult to picking up satisfactory images in a wide variety of shooting situations in both daytime and nighttime. For instance, in the case of the technology disclosed in Japanese Patent Application Laid-Open No. 2009-200660, if an excessive clip voltage is set, while the black sun phenomenon caused by high-intensity light can be eliminated or reduced effectively, fixed pattern noise is likely to be generated, leading to the problem of deterioration in image quality. Particularly in nighttime shooting, increasing a gain in order to increase the sensitivity can lead to a further deterioration in image quality, resulting in picked-up images with poor visibility. The technology disclosed in Japanese Patent Application Laid-Open No. 2010-268162 can reduce the black sun phenomenon on one hand, but is costly in manufacturing an image sensor having a structure that allows application of different accumulation times to different pixel areas on the other hand. Moreover, in the technology disclosed in Japanese Patent Application Laid-Open No. 2010-268162, a pixel group used as a reference for detection of black sun phenomenon is output by interpolation using pixels around it and not used as a picked-up signal. Consequently, the resolution of picked-up images is deteriorated. In the field of broadcast or advanced surveillance, various shooting conditions are imposed in daytime and nighttime, and high quality images are required to be picked up. Therefore, it is necessary to maintain high image quality while addressing the above-described problems.

SUMMARY OF THE INVENTION

The present invention provides an image pickup apparatus using a CMOS image sensor equipped with a CDS circuit that can prevent deterioration in image quality while reducing the aforementioned black sun phenomenon in various shooting conditions. The present invention also provides an image pickup system including such an image pickup apparatus and a lens apparatus.

According to the present invention, there is provided an image pickup apparatus that outputs a picked-up image signal based on a difference between an electric charge signal and a noise signal generated by a photoelectric converter, comprising: a generating unit that generates a difference image that is based on a difference between a first image picked up under a first image pickup condition and a second image picked up under a second image pickup condition in which an exposure amount of the photoelectric converter is smaller than the exposure amount of the photo electric converter in the first image pickup condition; a detector that detects a black spot area on the basis of the difference image generated by the generating unit; and a voltage controller that controls a clip voltage that is set to limit a voltage of the noise signal, on the basis of the detected black spot area.

The present invention can provides an image pickup apparatus equipped with a CMOS image sensors provided with a correlation double sampling (CDS) circuit that suppresses the black sun phenomena while preventing the quality of image from degrading in a various image pickup conditions and an image pickup system equipped with the image pickup apparatus and a lens apparatus.

Further features of the present invention will become apparent from the following description of exemplary embodiments with reference to the attached drawings.

DESCRIPTION OF THE EMBODIMENTS

Figure 1:
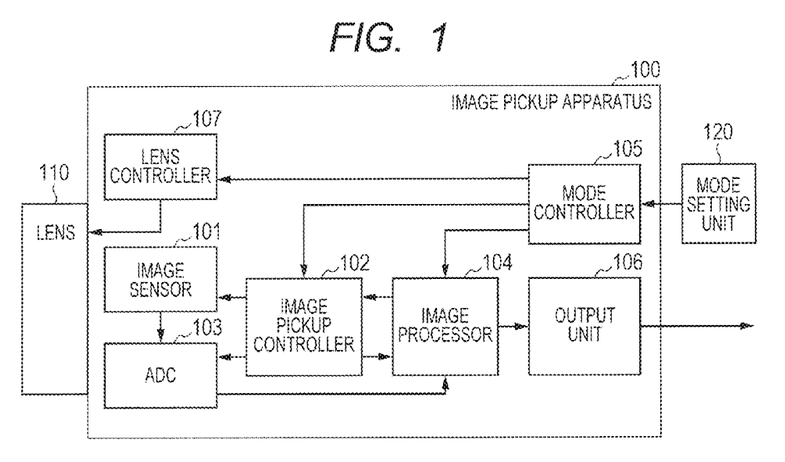
FIG. 1 is a diagram showing the configuration of an apparatus according to a first embodiment.

Preferred embodiments of the present invention will now be described in detail in accordance with the accompanying drawings. FIG. 1 is a diagram showing the configuration of an embodiment of the present invention.

First Embodiment

FIG. 1 is a diagram showing the configuration of an image pickup apparatus according to a first embodiment of the present invention. The image pickup apparatus 100 has an image pickup system including an image sensor 101 and performs image pickup processing by an image pickup controller 102 and an ADC 103.

A lens (lens apparatus) 110 is provided externally of the image pickup apparatus 100. The lens 110 and the image pickup apparatus 100 constitute an image pickup system. Light beams having passed through the lens 110 is focused on the image sensor 101 of the image pickup apparatus 100. The lens 110 includes components such as a stop unit, a magnification varying lens unit, and a focus lens unit, which are not shown in the drawings. The magnification varying lens unit in the lens 110 may be configured by either a variable-focal-length lens system or lens units having different fixed focal lengths.

The image pickup controller 102 controls accumulation operation and readout operation of the image sensor 101. The image pickup controller 102 includes a timing generator for driving of the image sensor 101 and the ADC 103. By image pickup control of the image sensor 101, a picked-up signal is output from the image sensor 101. The ADC 103 AD-converts the picked-up signal in synchronization with readout operation of the image sensor 101. The image pickup controller (clip voltage controller) 102 is adapted to generate and output synchronizing signals such as a frame synchronizing signal, a vertical synchronizing signal, and a horizontal synchronizing signal and to input a clip voltage signal (described later) to the image sensor 101.

The image pickup apparatus 100 has an image processor 104 arranged downstream of the image pickup controller 102 and the ADC 103. The picked-up signal after the AD conversion by the ADC 103 is input to the image processor 104 together with the aforementioned synchronizing signals generated in the image pickup controller 102. The image processor 104 performs processing such as well-known correction of the input picked-up signal, developing, and detection of a black spot area according to the present invention. Details of the black area detection will be described later. On the basis of the black area detection, the aforementioned clip voltage given to the image sensor 101 through the image pickup controller 102 is controlled. The signal (picked-up image signal) output from the image processor 104 is output from the image pickup apparatus 100 to an external device through an output unit 106. The output unit 106 converts the signal into an image signal such as an HDMI (registered trademark) signal or an HD-SDI signal.

A mode setting unit 120 allows input of a signal for selecting the operation mode of the image pickup apparatus 100 from outside the image pickup apparatus 100. For example, the mode setting unit 120 may be a button or switch. The mode setting may be carried out using a PC or using a GUI displayed on an external monitor.

The signal from the mode setting unit 120 is input to a mode controller 105. The mode controller 105 controls the operation of the image pickup controller 102, the image processor 104, and a lens controller 107 in accordance with the mode selected through the mode setting unit 120. The mode controller 105 also controls the processing of the black sun phenomenon detection according to the present invention, which will be described in detail later.

The lens controller 107 controls the lens 110 in accordance with a command from the mode controller 105. Specifically, the lens controller 107 controls driving of the stop unit, the magnification varying lens unit, and the focus lens unit in the lens 110.

Figure 2:
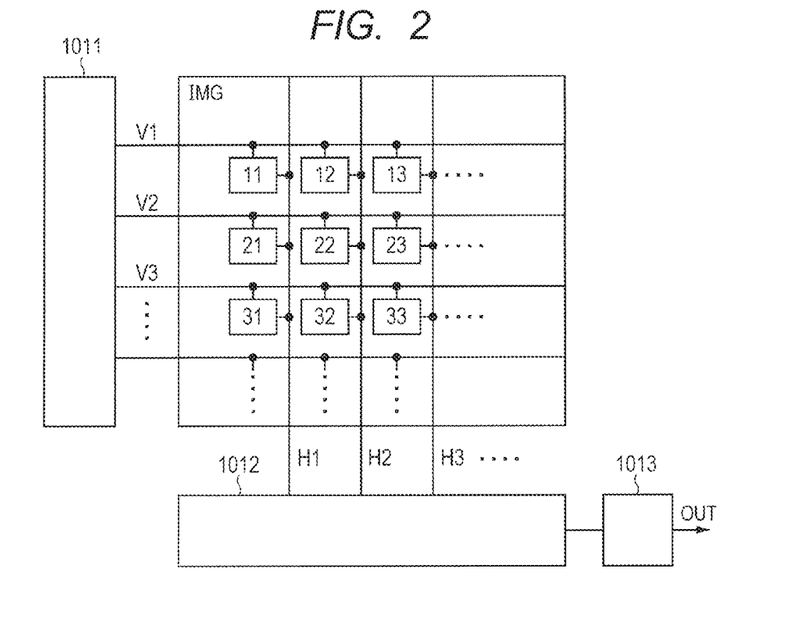
FIG. 2 is a first diagram showing the structure of an image sensor in the first embodiment.

FIG. 2 is a diagram illustrating the structure of the image sensor 101. As shown in FIG. 2, the image sensor 101 has a group of image pickup elements collectively denoted by Img. A part of the pixel arrangement including some pixels 11 to 33 included in the group Img of image pickup elements are illustrated in FIG. 2. Every pixel in the group Img is connected to a vertical circuit 1011 and a horizontal circuit 1012 through V1, V2, V3, . . . and H1, H2, H3, . . . .

The vertical circuit 1011 shown in FIG. 2 is connected with control lines (not shown) such as a line for reset pulses and a line for selected line shift. These control lines are connected to the image pickup controller 102 shown in FIG. 1, through which the aforementioned timing signal for controlling the operation of the image sensor 101 is transmitted. The horizontal circuit 1012 shown in FIG. 2 is connected with two control lines for transfer pulses and readout pulses, which will be described later. These control lines are connected to the image pickup controller 102 shown in FIG. 1, as with the above-described control lines for the vertical circuit 1011.

Figure 3:
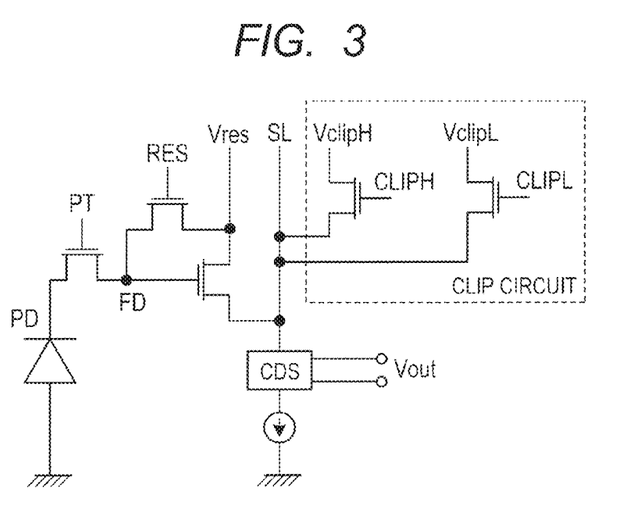
FIG. 3 is a second diagram showing the structure of the image sensor in the first embodiment.

FIG. 3 is a diagram showing the image pickup element in the image sensor (photoelectric conversion element) 101 in further details. The operation of the image sensor 101 will be described with reference to a timing chart shown in FIG. 4.

Figure 4:
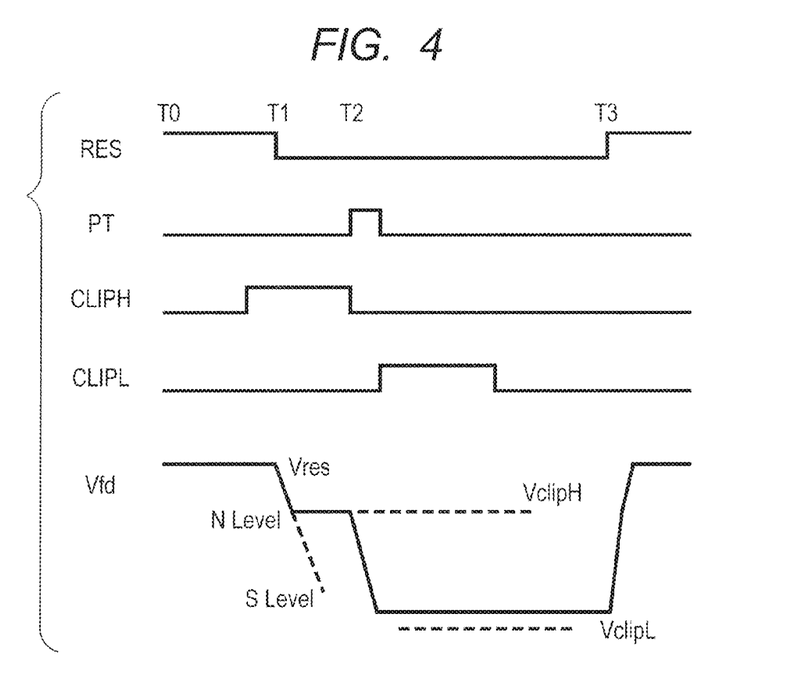
FIG. 4 is a chart showing readout timing of the image sensor in the first embodiment.

The image pickup element has a PD, which constitutes one pixel of the image sensor 101. The PD is a photoelectric converter that converts light into an electric charge signal and accumulates the electric charge signal. The image pickup element has a reset switch (RES), to which a reset voltage (Vres) is connected. As shown in FIG. 4, when RES is turned on at time T0, the electric potential Vfd of the floating diffusion (FD) is reset to Vres. The FD has a specific capacity and can store the electric charge signal.

In FIG. 4, when the reset switch RES is turned from on to off at time T1, an electric charge as the N signal is held in the FD. Then, the voltage level (Vfd) of the FD is NLevel.

A vertical signal line (SL) shown in FIG. 3 corresponds to H1, H2, H3 illustrated in FIG. 2. In the image sensor 101 according to the present invention, the electric charge as the N signal of the FD is output to the signal line SL and input to the CDS circuit shown in FIG. 2 after resetting by the RES, namely between time T1 and time T2 in FIG. 4. In the case where normal object light is incident on the image sensor 101, the aforementioned NLevel is acquired as a noise level. On the other hand, in the case where high intensity light is incident on the image sensor 101, electric charge leaks from the PD to the FD, leading to a decrease in the NLevel, as shown in FIG. 4.

When the aforementioned transfer pulse is input to a transfer switch PT shown in FIG. 3, the transfer switch PT is turned ON and the electric charge signal accumulated in the PD is transferred to the FD. In FIG. 4, after the lapse of a predetermined time or accumulation time (first image pickup condition) from time T1, the transfer switch PT is turned on at time T2, whereby an electric charge signal accumulated in the PD as the S signal (first image) is transferred to the FD. Then, the voltage level (SLevel) of the S signal according to the electric charge accumulated in the PD is obtained as the electric potential Vfd of the FD. Then, the S signal is output to the signal line SL and input to the CDS circuit, as with the N signal. The CDS circuit outputs a differential signal of the N signal (second image) and the S signal (first image), namely a differential voltage as the difference between the NLevel and the SLevel, at Vout. After the SLevel is input to the CDS, the reset switch RES is turned on again at time T3 in FIG. 4, and this state is maintained until the next readout. Subsequently, the processing starting from time T0 is performed repeatedly. Thus, image pickup operation is performed consecutively.

In normal image picking-up, namely in image picking-up in cases where the quantity of light incident on the image sensor 101 is in a predetermined range, a noise level attributed to the circuit of the image sensor 101 appears in the FD during the period from time T1 to time T2 in FIG. 4. On the other hand, in cases where light having very high intensity is incident on the PD, an electric charge signal leaks from the PD to the FD, resulting in the black sun phenomenon, which is addressed by the present invention.

As a countermeasure, a clip circuit H and a clip circuit L are provided in the area captioned as "CLIP CIRCUIT" indicated by the broken line in FIG. 3. If the switch CLIPH in FIG. 3 is turned on during the period from time T1 to time T2 in FIG. 4, the signal line SL or the NLevel is limited by VclipH. In other words, the NLevel is limited by a lower bound so as not to have values lower than VclipH.

If the switch CLIPL in FIG. 3 is turned on at the time when the S signal accumulated in the PD is transferred to the signal line SL after time T2, the vertical signal line is limited by VclipL. Thus, the NLevel is limited by a lower bound so as not to have values lower than VclipL.

Setting the value VclipH high can reduce the black sun phenomenon. However, if an electrical potential higher than the NLevel in the normal image pickup is set as VclipH, while the black sun phenomenon can be reduced, the noise component (noise signal) cannot be cancelled satisfactory in the differential output of the CDS circuit. Thus, a fixed pattern noise is generated, leading to deterioration in image quality.

In this embodiment, in order to prevent deterioration in image quality while reducing the black sun phenomenon a clip voltage is set taking into account the shooting mode. To set an optimum clip voltage suitable for the scene to be shot, the clip voltage is controlled dynamically.

Figure 5A:
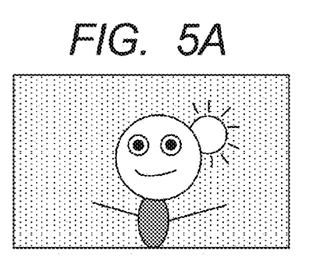
FIG. 5A schematically shows an image picked up by the apparatus according to the first embodiment.
Figure 5B:
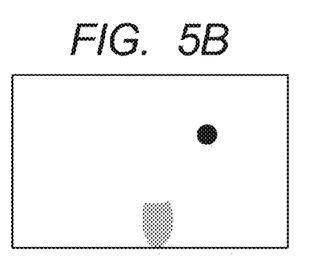
FIG. 5B schematically shows an image picked up by the apparatus according to the first embodiment.
Figure 5C:
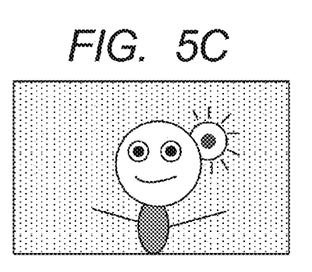
FIG. 5C schematically shows an image picked up by the apparatus according to the first embodiment.
Figure 5D:
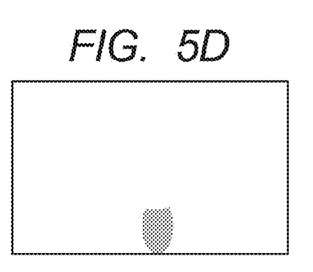
FIG. 5D schematically shows an image picked up by the apparatus according to the first embodiment.

A method of reducing the black sun phenomenon under a condition in which there is a highly-bright object will be described with reference to exemplary shooting scenes shown in FIGS. 5A to 5D. FIG. 5A shows a shooting scene in which a main subject to be shot and the sun in the background of the main subject are shot. It is assumed that actual picked up images are those shown in FIGS. 5B and 5C. FIGS. 5B and 5C show states in which the black sun phenomenon occurs in the portions of the sun shown in FIGS. 5D and 5A respectively. If the black sun phenomenon does not occur, picked up images in which the highly bright areas are saturated without becoming black would be obtained, namely the images shown in FIGS. 5A and 5D would be obtained rather than the images shown in FIGS. 5C and 5B respectively.

Figure 6:
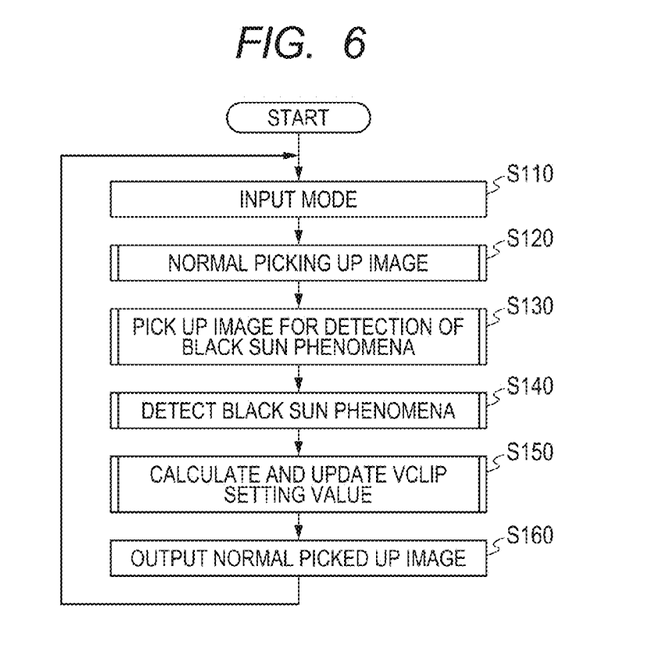
FIG. 6 is a flow chart of a process performed in the apparatus according to the first embodiment.

FIG. 6 is a flow chart of processing carried out by the image pickup apparatus 100 of this embodiment. When the image pickup apparatus 100 is turned on, the processing starting from step S110 in FIG. 6 is executed sequentially.

Figure 7:
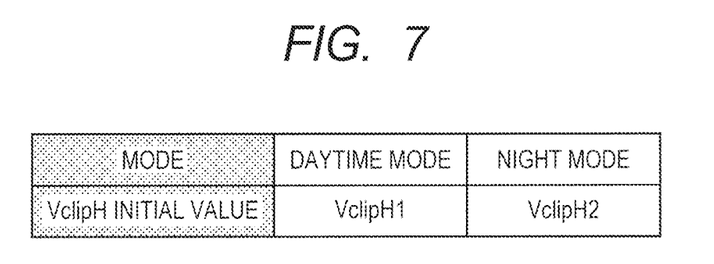
FIG. 7 shows initial values of VclipH set in the first embodiment.
Figure 8:
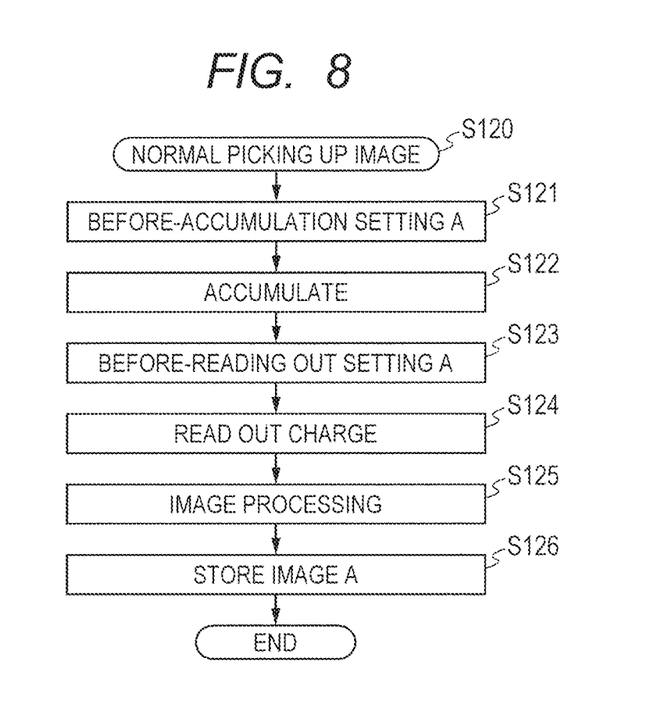
FIG. 8 is a flow chart of a subroutine of step S120 in the flow chart of FIG. 6 in the first embodiment.

In step S110 in FIG. 6, the shooting mode is set by setting made through the mode setting unit 120 shown in FIG. 1. The shooting mode thus set is held by the mode controller 105. It is assumed that either daylight mode or nighttime mode is set as shown in FIG. 7. Then in step S120 in FIG. 6, normal image picking-up is performed. FIG. 8 shows the subroutine of step S120.

In step S121 in FIG. 8, presetting A before accumulation is performed. Specifically, a shutter speed is set according to the mode set in step S110 in FIG. 6. In step 121, the shutter speed may be set to a value suitable for the format of the image output through the output unit 106. The shutter speed may be set externally through a shutter speed setting unit, which is not shown in the drawing.

After the processing of step S121 in FIG. 8 is executed, the process proceeds to step S122, where accumulation is performed. Here, accumulation is performed as normal image picking-up. Accumulation of the image sensor 101 is carried out by the image pickup controller 102 with the shutter speed set in step S121. After the image sensor 101 is exposed for an accumulation time determined by the shutter speed, the process proceeds to step S123.

In step S123 in FIG. 8, presetting A before readout is performed. In step S123, presetting A before readout in the case of normal image picking-up is performed, where VclipH (VclipH1 or VclipH2) is updated in accordance with the mode set in step S110 in FIG. 6 and set for the image sensor 101. For example, in the case where the daytime mode is set in step S110 in FIG. 6, VclipH1 is set as the initial value of VclipH. While in the process shown in FIG. 6, the processing starting from step S110 is executed again after the completion of step S160, VclipH is updated in step S123 by VclipH set in step S150, which will be described later.

In step S124 in FIG. 8, the picked-up signal is read out from the image sensor 101 by the image pickup controller 102. The picked-up signal after AD-conversion by the ADC 103 is input to the image processor 104. Thus, the N signal and the S signal after exposure with the image sensor 101 are input to the CDS circuit of each pixel, as described with reference to FIGS. 3 and 4, and output from the image sensor 101.

Then, in step S125 in FIG. 8, image processing is performed by the image processor 104 shown in FIG. 1. For example, processing such as well-known correction using optical black pixels and scratch correction is performed.

Then, in step S126 in FIG. 8, the image after processing in step S125 is stored in a memory (not shown) as an image A. The image A thus stored is the image shown in FIG. 5B or 5C.

Figure 9:
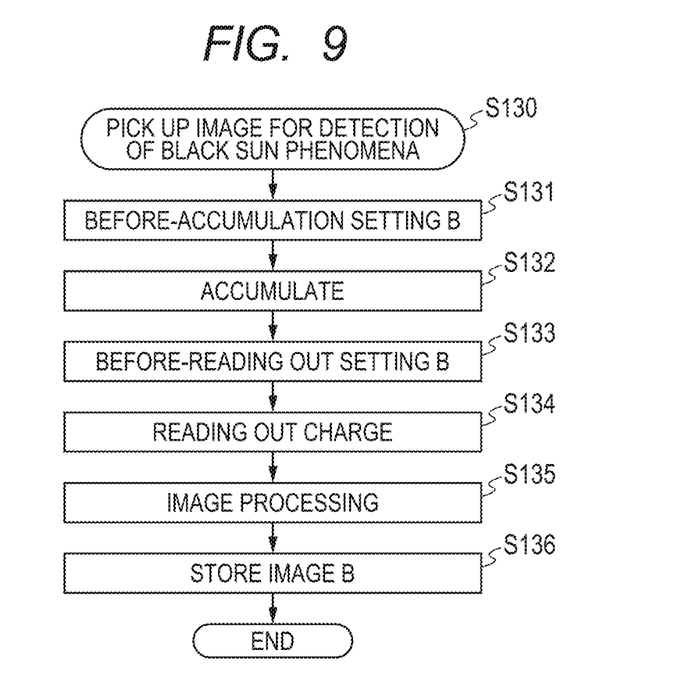
FIG. 9 is a flow chart of a subroutine of step S130 in the flow chart of FIG. 6 in the first embodiment.

After the processing of step S126 is executed, the subroutine shown in FIG. 8 is terminated, and the process proceeds to step S130 in FIG. 6. In step S130, image picking-up for detection of black sun phenomenon is performed. FIG. 9 shows the subroutine of step S130.

In step S131 in FIG. 9, presetting before accumulation for detecting black spot areas is performed. This processing is similar to the processing in step S121, but in step S131 a shutter speed (or shutter time) much shorter than the shutter speed set in step S121 is set. The shutter speed set in this step may be an arbitrary value. In the series of processing of the subroutine of step S130 shown in FIG. 9, an image with a small exposure amount is picked up so that black sun phenomenon does not occur in the image picking-up. The shutter speed set in step S131 may be set externally through a shutter speed setting unit, which is not shown in the drawing, in such a way as to meet requirements in step S131.

In step S132 in FIG. 9, accumulation is carried out with a short shutter time set in step S131. After the image sensor 101 has been exposed for the accumulation time set in step S131, the process proceeds to step S133.

In step S133 in FIG. 9, presetting B before readout is performed. In step S133, presetting B before readout in the case of image picking-up for detection of black sun phenomenon is performed, where VclipH set in step S110 in FIG. 6 is updated and set for the image sensor 101. As described above, in the black sun phenomenon detection process in FIG. 9, image picking-up is performed under conditions that do not give rise to black sun phenomenon. Therefore, it is desirable that a high voltage is set as VclipH temporarily. In other word, base data used to remove the normal noise component is acquired. The value of VclipH set in this step may be adapted to be set externally, as described above.

In steps S134 and S135 in FIG. 9, readout of the picked-up signal and image processing are performed as in steps S124 and S125 in FIG. 8.

Figure 10:
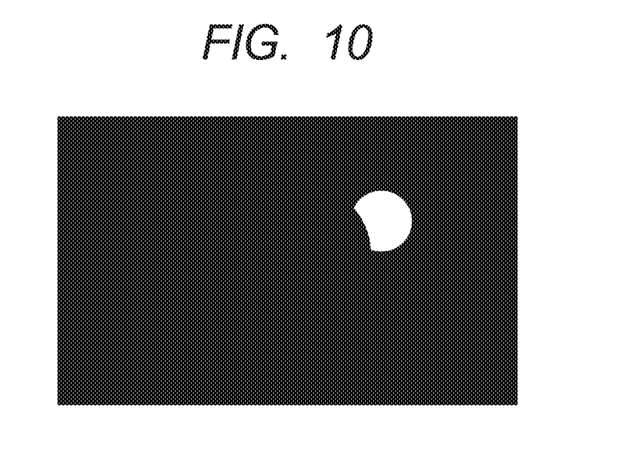
FIG. 10 schematically shows an image B picked up by the apparatus according to the first embodiment.

In step S136 in FIG. 9, the image after processing in step S133 is stored as an image B in the memory (not shown). The image B thus stored is something like the image shown in FIG. 10. In this image, the region of the sun is picked up as white, and the other region is picked up as black.

Figure 11:
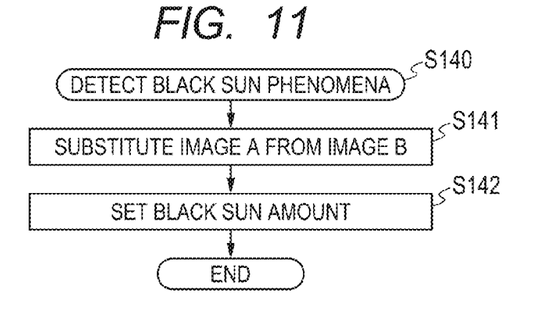
FIG. 11 is a flow chart of a subroutine of step S140 in the flow chart of FIG. 6 in the first embodiment.

After the processing of step S136 in FIG. 9 is executed, the subroutine shown in FIG. 9 is terminated, and the process proceeds to step S140 in FIG. 6. In step S140, detection of black sun phenomenon is performed in the image processor 104, which constitutes black sun phenomenon detection unit. FIG. 11 shows the subroutine of step S140.

Figure 12:
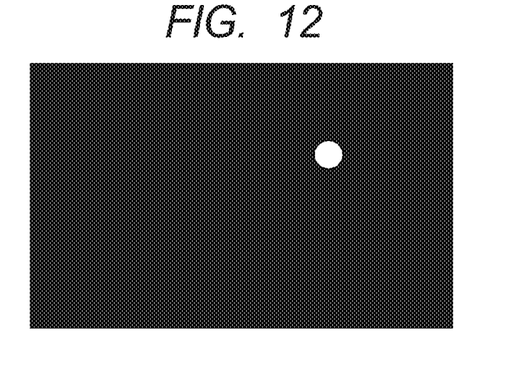
FIG. 12 schematically shows an image picked up in step S141 in the flow chart in FIG. 11 in the first embodiment.

In step S141 in FIG. 11, the difference between the pixel value in the image A stored in step S126 in FIG. 8 and the pixel value in the image B stored in step S136 in FIG. 9 is calculated for each pixel by the image processor 104 serving as an image generating unit. Specifically, the image A is subtracted from the image B. In the case where the result of the subtraction is a negative value, a lower limit of 0 is set. An image (difference image) obtained as the result of the processing of step S141 is schematically shown in FIG. 12. Only the region in which the black sun phenomenon occurs is output as a white region (in which the pixels have positive values) and the other region is output as a black region (in which the values of the pixels are zero). In this embodiment, a case where the image A is subtracted from the image B has been described by way of example, the method is not limited to this. When the pixel values of one image are subtracted from the pixel values of the other image, the resultant values in the black spot area and the resultant values in the region in which the black sun phenomenon does not occur have opposite signs. Thus, the black spot area can be specified from this.

After the processing of step S141 in FIG. 11 is executed, the process proceeds to step S142. In step S142, a black spot amount is set on the basis of the image obtained in step S141. In this step, a value obtained by summing up the luminance values of the obtained image shown in FIG. 12, the area of the black spot area, the highest luminance value, or the average illuminance value may be held as the black spot amount.

Figure 13:
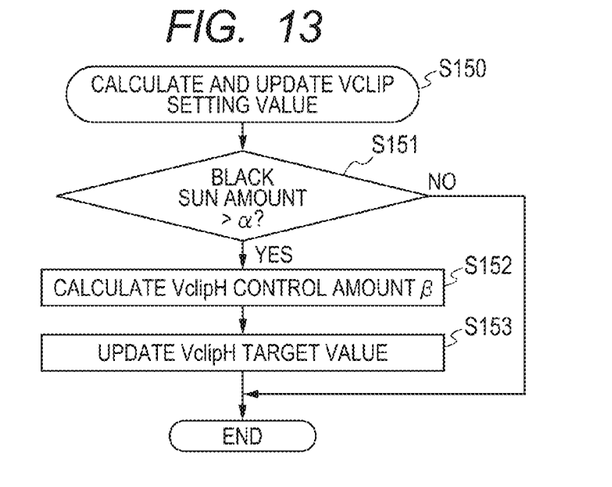
FIG. 13 is a flow chart of a subroutine of step S150 in the flow chart of FIG. 6 in the first embodiment.

After the processing of step S142 in FIG. 11 is executed, the subroutine shown in FIG. 11 is terminated, and the process proceeds to step S150 in FIG. 6. In step S150, VclipH to be used in the next image picking-up process is calculated from the black spot amount obtained in step S140. Thus, the value of VclipH is updated. FIG. 13 shows the subroutine of step S150.

In step S151 in FIG. 13, the black spot amount calculated in step S142 is compared with a threshold $\alpha$. The threshold $\alpha$ is a value used to determine whether the black sun phenomenon is occurring or not. The threshold $\alpha$ may be an arbitrary value larger than zero. If it is determined in step S151 that the black spot amount is larger than the threshold $\alpha$, namely if step S151 is answered in the affirmative, it is concluded that the black sun phenomenon is occurring, and the process proceeds to step S152. If step S151 is answered in the negative, it is concluded that the black sun phenomenon is not occurring, and the subroutine shown in FIG. 13 is terminated.

In step S152 in FIG. 13, a control amount $\beta$ of VclipH is calculated. An equation used to calculate the control amount $\beta$ is presented below as equation (1).

$$\beta = (\text{black spot amount} - \alpha) \times \gamma \qquad (1).$$

In equation (1), $\gamma$ is a certain conversion coefficient used to convert the black spot amount into the control amount $\beta$ of the voltage of VclipH. In the present invention, in the process of the flow chart shown in FIG. 6, VclipH is controlled in such a way that the black spot amount does not exceed the threshold a in step S151. The value of $\gamma$ may be determined as a fixed value by experiment and embedded in a program. Alternatively, an optimum value of $\gamma$ may be determined individually in the manufacturing process and stored in the memory (not shown).

In step S153 in FIG. 13, the control amount $\beta$ calculated in step S152 is subtracted from the currently set value of VclipH to update the target value of VclipH. In the image pickup setting made in step S121 in FIG. 8 and step S131 in FIG. 9, the actual voltage value VclipH given to the image sensor 101 is updated with the target value of VclipH updated in step S153.

After the processing of step S153 in FIG. 13 is executed, the subroutine shown in FIG. 13 is terminated, and the process proceeds to step S160 in FIG. 6.

In step S160 in FIG. 6, the normally picked-up image is output. Specifically, the image A stored in the memory in step S124 in FIG. 8 is output from the image pickup apparatus 100 to the outside through the output unit 106. After the processing of step S160 in FIG. 6 is executed, the processing starting from step S110 is executed sequentially, namely the processing of steps S110 to S160 is executed repeatedly. In this way, in the image picking-up process, normal image picking-up and image picking-up for detection of black sun phenomenon are performed alternately, and a normally picked-up image is output from the apparatus to the outside as one frame of image.

The processing of from step S110 to step S160 is performed in one frame period. The image obtained by the processing of image picking up for detection of black sun phenomenon in step S130 in FIG. 6 is stored in the memory as the image B in step S134 in FIG. 9, but this image is not output from the image pickup apparatus 100 to the outside. Timing of this processing is shown in FIG. 14.

Figure 14:
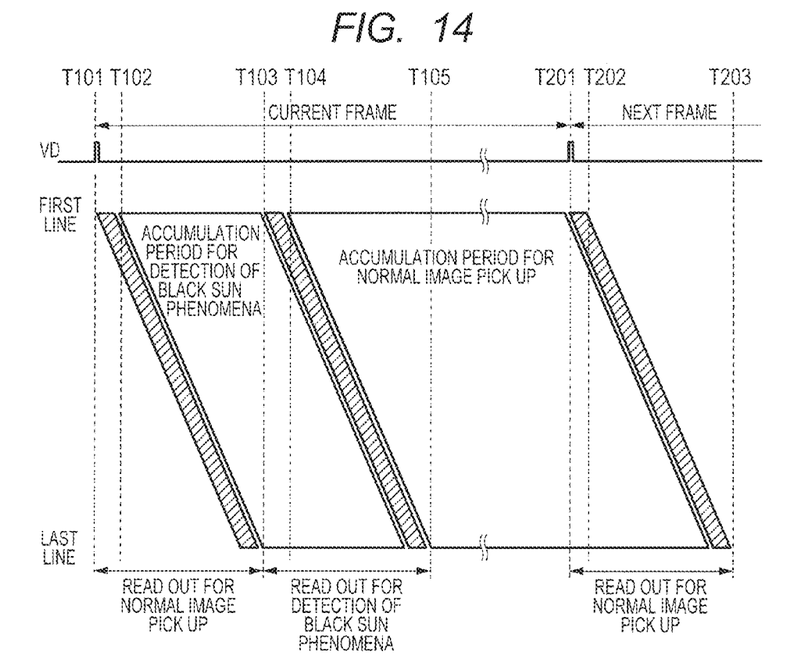
FIG. 14 is a chart showing timing of processing in the first embodiment.

FIG. 14 shows that a vertical synchronizing signal (VD) generated by the image pickup controller 102 is generated for every frame. The VD is turned on at time T101 and time T103. The processing shown in FIG. 6 has been described as sequentially executed processing. In practice, a series of image pickup processing is executed in a pipeline as shown in FIG. 14, as described in detail in the following.

In the description of the processing shown in FIG. 14, we focus on the processing of the first line. As the vertical synchronizing signal VD is turned on at time T101 in FIG. 14, readout processing for normal image picking-up is started from the first line. In synchronization with the VD timing at time T101, the above-described presetting before readout in step S123 in FIG. 8 is performed. FIG. 14 shows rolling-shutter image picking-up process, and readout of the subsequent lines is performed after the completion of readout of the first line.

In the case shown in FIG. 14, after the completion of readout of the first line, the image processing in step S125 in FIG. 8 is started at time T102, and the accumulation in step S132 in FIG. 9 is performed. The accumulation in step S132 in FIG. 9 is started from the first line. Subsequently, readout and accumulation are performed sequentially until time T103.

Then, at time T103, the above-described readout processing in step S134 in FIG. 9 is started in the first line. Thereafter, at time T104, the readout of the first line is completed, and the image processing in step S135 in FIG. 9 and the storage of the image B in step S136 are performed.

During the period from time T104 to time T105 in FIG. 14, the processing from readout in step S134 to step S136 in FIG. 9 is performed for lines subsequent to the first line. At time T105, readout has been completed for all the lines of the image sensor 101, and therefore the processing from step S140 to step S160 in FIG. 6 can be performed.

During the time from time T105 to time T201 in FIG. 14, accumulation as normal image picking-up is performed in preparation for readout of the next frame, and the image output in step S160 in FIG. 6 is performed. At time T201, as at time T101, the aforementioned presetting before readout in step S123 in FIG. 8 is performed, where the updated VclipH is set for the image sensor.

As described above, in this embodiment, normal image picking-up and image picking-up for detection of black sun phenomenon are performed in one frame, whereby the voltage VclipH is controlled appropriately. Thus, an appropriate voltage VclipH adapted to the shooting scene can be set, enabling reduction of the black sun phenomenon. As described above, the image obtained by image picking-up for detection of black sun phenomenon is not output to the outside, and the image A picked up in the normal image picking-up is stored in the memory. The image A stored in the memory is output in step S160 in FIG. 6. Thus, switching of bright and dark output images, which can be unpleasant to the photographer, can be prevented from occurring.

While image picking-up in the daytime mode has been described by way of example, the shooting mode may be set to the nighttime mode. In the case of night time shooting, the sun in the image shown in FIG. 5A may be regarded as a headlight of a car present in the shooting scene. In the case of the nighttime shooting mode, it is appropriate that a voltage value VclipH2 lower than the initial value VclipH1 of the voltage VclipH set in FIG. 7 and step S123 in FIG. 8 be set initially. In the nighttime shooting, brightness of the object is lower than in the typical daytime shooting. Therefore, if the voltage VclipH is set high, fixed pattern noise becomes conspicuous. Moreover, since in the nighttime, it is considered that the gain is increased to enhance the sensitivity in many situations, it is desirable that VclipH be set as low as possible so as not to affect the image quality. In addition, appropriately setting the voltage VclipH as described in this embodiment can prevent or reduce the deterioration in the image quality and the occurrence of the black sun phenomenon in the nighttime shooting also. As the set value of VclipH becomes higher, the fixed pattern noise increases, as described before. Therefore, the value of VclipH may be set choosing an appropriate trade-off between the black spot amount calculated in step S140 in FIG. 6 and the amount of fixed pattern noise generated. For this purpose, it is preferred that calculation for estimating the fixed pattern noise be performed after image picking-up with the updated VclipH is performed in step S150.

While in the configuration according to the embodiment shown in FIG. 3, CLIPL and CLIPH are set separately, CLIPL and CLIPH may be controlled as exclusive logic. In other words, while in the above-described case separate circuits are provided for VclipH and VclipL, they may be set by one clip circuit. In that case, VclipH and VclipL may be selectively set in accordance with the timing shown in FIG. 4 when performing readout.

The output format of the output unit 106 is not limited to HD-SDI or HDMI, but the present invention can be applied also to apparatuses that have other various output formats. The ADC 103 may be replaced by a device called AFE. AFE is a device having a timing generator incorporated in an ADC. This also applies to the embodiment described in the following.

Second Embodiment

In the first embodiment described above, VclipH is controlled by performing normal image picking-up and image picking-up for detection of black sun phenomenon on one frame, with the image obtained by image picking-up for detection of black sun phenomenon being not output to the outside, and the image picked up by normal image picking-up being output. In the second embodiment, image output in the case where a shutter speed slower than that in the first embodiment is set. When the shutter speed is slow, it is difficult to perform normal image picking-up and image picking-up for detection of black sun phenomenon in one frame period, unlike in the case of the first embodiment. We will demonstrate with the second embodiment that the present invention can also be adapted to slower shutter speeds by allowing frames in which normal image picking-up is performed and frames in which image picking-up for detection of black sun phenomenon is performed to be intermixed.

Figure 15:
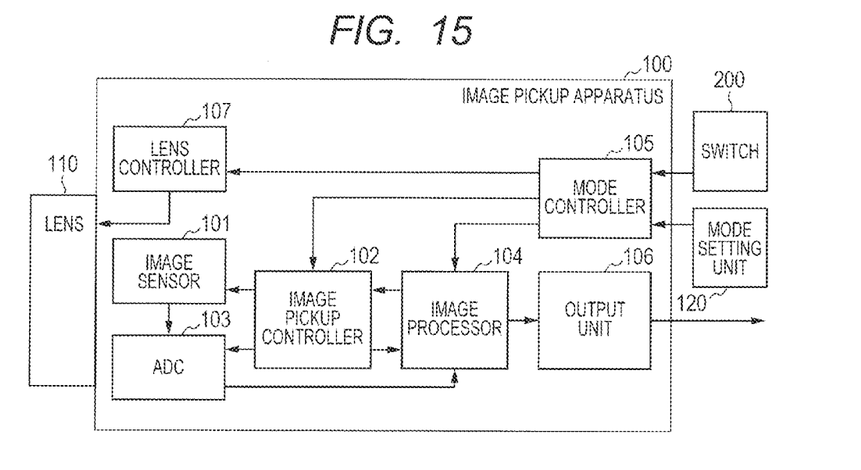
FIG. 15 is a diagram showing the configuration of an image pickup apparatus according to a second embodiment.

FIG. 15 is a diagram showing the configuration of an image pickup apparatus according to the second embodiment. In the apparatus shown in FIG. 15, a switch 200 is added to the apparatus according to the first embodiment shown in FIG. 1. In this embodiment, the switch 200 is used as an input unit for a trigger signal for black sun phenomenon detection.

Figure 16:
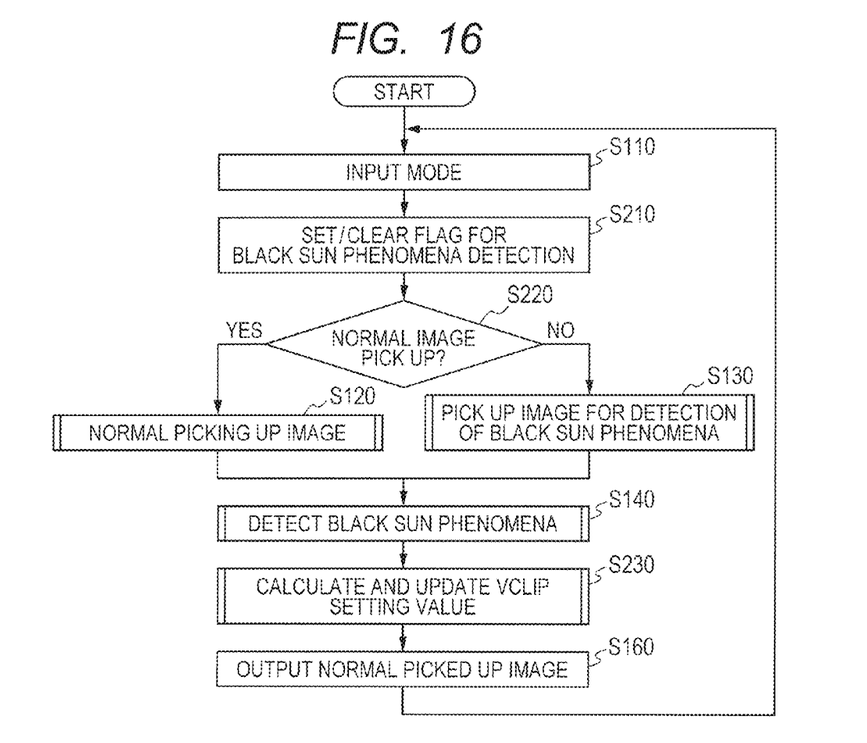
FIG. 16 is a flow chart of a process performed in the apparatus according to the second embodiment.

FIG. 16 is a flow chart of processing executed by the image pickup apparatus 100 according to this embodiment. When the image pickup apparatus 100 is turned on, the processing starting from step S110 in FIG. 16 is executed sequentially.

In step S110 in FIG. 16, the shooting mode is set by setting made through the mode setting unit 120 shown in FIG. 1, as in the first embodiment. After the step S110 is executed, the process proceeds to step S210.

In step S210 in FIG. 16, input for black sun phenomenon detection is performed. Specifically, a determination is made as to whether an input through the switch 200 shown in FIG. 15 is made or not, and a flag for black sun phenomenon detection is set. After the processing of step S210 is executed, the process proceeds to step S220.

In step S220 in FIG. 16, it is determined whether image picking-up process is normal image picking up or not. As described above, in this embodiment, frames in which normal image picking-up is performed and frames in which image picking-up for detection of black sun phenomenon are intermixed. This determination is made based on the flag for black sun phenomenon detection set in step S210. When the flag for black sun phenomenon detection is not set, an affirmative determination is made always. On the other hand, when the flag for black sun phenomenon detection is set, a negative determination is made for one frame per every several frames, and an affirmative determination is made for the other frames. For example, one cycle is made up of five frames, and an affirmative determination is made for four frames, and a negative determination is made for one frame. The number of frames in one cycle may be set arbitrarily, which may be set externally of the image pickup apparatus 100 through a setting unit that is not shown in the drawings.

If the determination made in step S220 in FIG. 16 is affirmative, the process proceeds to step S120. In step S120, processing the same as the normal image picking-up described in connection with step S120 in FIG. 6 is performed. After step S120 is executed, the process proceeds to step S140. If the determination made in step S220 is negative, the process proceeds to step S130. In step S130, processing the same as image picking-up for detection of black sun phenomenon described in connection with step S130 in FIG. 6 is performed. After step S130 is executed, the process proceeds to step S140.

In the first embodiment, a case in which the processing of step S120 and the processing of step S130 are performed in parallel in pipeline was described with reference to FIG. 14. In this embodiment, the processing of step S120 and the processing of step S130 shown in FIG. 16 are executed exclusively in one frame. In other words, either image picking-up for detection of black sun phenomenon or normal image picking-up is performed in synchronization with the vertical synchronizing signal VD.

Returning back to the flow chart in FIG. 16, in step S140, detection of black sun phenomenon is performed as in step S140 in FIG. 6. As described above, according to the determination made in step S220, step S130 is executed once in every several frames, and an image stored in the memory as the image B is held over several frames. On the other hand, an image stored in the memory as the image A in nearly every frame except for the frames in which image picking-up for detection of black sun phenomenon is performed in step S130 is updated repeatedly. In step S140, detection of black sun phenomenon is performed using the image A and the image B thus obtained, as in the first embodiment. After step S140 is executed, the process proceeds to step S230.

Figure 17:
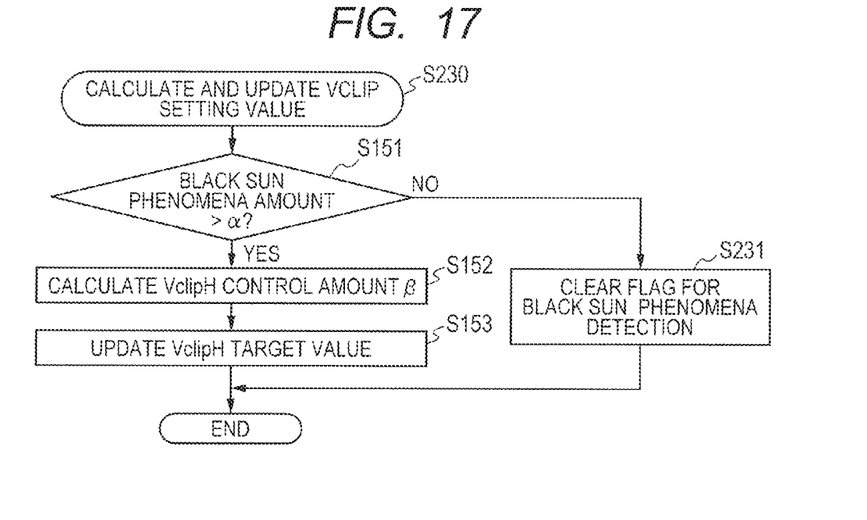
FIG. 17 is a flow chart of a subroutine of step S230 in the flow chart of FIG. 16 in the second embodiment.

In step S230 in FIG. 16, calculation and update of the Vclip setting value is performed. FIG. 17 shows a subroutine of step S230.

In step S151 in FIG. 17, a determination as to the black spot amount calculated in step S140 is performed as in the process shown in FIG. 13. If step S151 is answered in the affirmative, the process proceeds to step S152. If step S151 is answered in the negative, the process proceeds to step S231. In steps S152 and S153 in FIG. 17, processing same as that in FIG. 13 is performed.

In step S231 in FIG. 17, the flag for black sun phenomenon detection set in step S210 in FIG. 16 is cleared. VclipH is controlled repeatedly as long as it is determined in step S151 in FIG. 17 that the black spot amount is larger than the threshold α. After an appropriate VclipH is set and the black spot amount becomes equal to or smaller than the threshold α, the aforementioned flag is cleared.

After the processing of step S231 or S153 is executed, the subroutine of FIG. 17 is terminated, and the process proceeds to step S160 in FIG. 16. In step S160, an image picked up by normal image picking-up is output from the image pickup apparatus 100 to the outside, as in step S160 in FIG. 6.

In this embodiment, there has been described a case in which the present invention is adapted to slow shutter speeds by allowing frames in which normal image picking-up is performed and frames in which image picking-up for detection of black sun phenomenon is performed to be intermixed. Moreover, there has been described a case in which the switch 200 is provided to control VclipH in such a way as to prevent black sun phenomenon by performing minimum image picking up for detection of black sun phenomenon.

While preferred embodiments of the present invention have been described, it should be naturally understood that the present invention is not limited to the embodiments, but various modifications and changes can be made thereto without departing from the essence of the present invention. The features of the above-described embodiments may be adopted in combination, if feasible.

In the first and second embodiments described in the foregoing, the shutter speed set for image picking-up for detection of black sun phenomenon is faster than the shutter speed set for normal image picking-up. What is essential is that an image for detection of black sun phenomenon be picked up on the condition that black sun phenomenon does not occur. In other words, a condition as to the exposure amount that does not cause the quantity of electric charge accumulated in the photodiode PD to exceed a predetermined quantity may be set as the condition of image picking-up for detection of black sun phenomenon (second image pickup condition). Thus, for example, an image picked up in a state in which the aperture ratio with the stop of the lens 110 is set lower (namely, stopped down to smaller aperture diameter) than the aperture ratio set at the time of normal image picking-up may be used as an image for detection of black sun phenomenon. The present invention may also be carried out by adopting the above image picking-up conditions and the image picking-up condition about the shutter speed described in the first and second embodiments in combination.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-036105, filed Feb. 26, 2015 which is hereby incorporated by reference herein in its entirety.

What is claimed is:

1. An image pickup apparatus that outputs a picked-up image signal based on a difference between an electric charge signal and a noise signal generated by a photoelectric converter, comprising:
   a generating unit that generates a difference image that is based on a difference between a first image picked up under a first image pickup condition and a second image picked up under a second image pickup condition in which an exposure amount of the photoelectric converter is smaller than the exposure amount of the photo electric converter in the first image pickup condition;
   a detector that detects a black spot area on the basis of the difference image generated by the generating unit; and
   a voltage controller that controls a clip voltage that is set to limit a voltage of the noise signal, on the basis of the detected black spot area.

2. An image pickup apparatus according to claim 1, wherein the voltage controller calculates a black spot amount on the basis of the detected black spot area and controls the clip voltage according to the black spot amount.

3. An image pickup apparatus according to claim 1, wherein the second image is an image picked up with a second accumulation time shorter than a first accumulation time with which the first image is picked up.

4. An image pickup apparatus according to claim 1, wherein the first image is output from the image pickup apparatus to the outside, and the second image is not output from the image pickup apparatus to the outside.

5. An image pickup apparatus according to claim 1, wherein the first image and the second image are picked up alternately.

6. An image pickup apparatus according to claim 1, comprising an input unit used to input a signal from outside, wherein the second image is picked up based on an input signal input through the input unit.

7. An image pickup system comprising:
   an image pickup apparatus that outputs a picked-up image signal based on a difference between an electric charge signal and a noise signal generated by a photoelectric converter, the image pickup apparatus including:
   a generating unit that generates a difference image that is based on a difference between a first image picked up under a first image pickup condition and a second image picked up under a second image pickup condition in which an exposure amount of the photoelectric converter is smaller than the exposure amount of the photo electric converter in the first image pickup condition;
   a detector that detects a black spot area on the basis of the difference image generated by the generating unit; and
   a voltage controller that controls a clip voltage that is set to limit a voltage of the noise signal, on the basis of the detected black spot area; and
   a lens apparatus having an aperture stop and a stop controller that controls the aperture stop,
   wherein the second image is an image picked up at a second stop value that is stopped down from a first stop value at which the first image is picked up.

8. An image pickup apparatus that outputs a picked-up image signal based on a difference between an electric charge signal and a noise signal generated by a photoelectric converter, comprising:
   a processor that executes instructions stored in a memory to generate a difference image that is based on a difference between a first image picked up under a first image pickup condition and a second image picked up under a second image pickup condition in which an exposure amount of the photoelectric converter is smaller than the exposure amount of the photo electric converter in the first image pickup condition;
   a detector that detects a black spot area on the basis of the generated difference image; and
   a voltage controller that controls a clip voltage that is set to limit a voltage of the noise signal, on the basis of the detected black spot area.

9. An image pickup apparatus according to claim 8, wherein the voltage controller calculates a black spot amount on the basis of the detected black spot area and controls the clip voltage according to the black spot amount.

10. An image pickup apparatus according to claim 8, wherein the second image is an image picked up with a second accumulation time shorter than a first accumulation time with which the first image is picked up.

11. An image pickup apparatus according to claim 8, wherein the first image is output from the image pickup apparatus to the outside, and the second image is not output from the image pickup apparatus to the outside.

12. An image pickup apparatus according to claim 8, wherein the first image and the second image are picked up alternately.

13. An image pickup apparatus according to claim 8, further including a switch to input a signal from outside, wherein the second image is picked up based on the input signal.

14. An image pickup system comprising:
- an image pickup apparatus that outputs a picked-up image signal based on a difference between an electric charge signal and a noise signal generated by a photoelectric converter, the image pickup apparatus including:
  - a processor that executes instructions stored in a memory to generate a difference image that is based on a difference between a first image picked up under a first image pickup condition and a second image picked up under a second image pickup condition in which an exposure amount of the photoelectric converter is smaller than the exposure amount of the photo electric converter in the first image pickup condition;
  - a detector that detects a black spot area on the basis of the generated difference image; and
  - a voltage controller that controls a clip voltage that is set to limit a voltage of the noise signal, on the basis of the detected black spot area; and
- a lens apparatus having an aperture stop and a stop controller that controls the aperture stop,
- wherein the second image is an image picked up at a second stop value that is stopped down from a first stop value at which the first image is picked up.

* * * * *